United States Patent [19]

Whitaker et al.

[11] Patent Number: 4,811,921

[45] Date of Patent: Mar. 14, 1989

[54] CYCLIC CONTROL STICK

[76] Inventors: Charles N. Whitaker, 2834 S. Extension Rd., No. 2024, Mesa, Ariz. 85202; Richard E. Zimmermann, 425 E. Greenway, Tempe, Ariz. 85282

[21] Appl. No.: 64,988

[22] Filed: Jun. 22, 1987

[51] Int. Cl.[4] .............. B64C 13/04; B64C 13/06
[52] U.S. Cl. ................... 244/234; 74/491; 74/492; 74/493; 74/523
[58] Field of Search ............ 244/234, 121, 17.11; 74/491, 523, 527, 492, 522, 558.5, 493; 403/104, 109; 188/376; 280/750, 751

[56] References Cited

U.S. PATENT DOCUMENTS

| | | | |
|---|---|---|---|
| 2,075,110 | 3/1937 | Garretson | 74/493 |
| 2,827,801 | 3/1958 | Ingolia | 74/558.5 |
| 2,910,887 | 11/1959 | Helms | 74/493 |
| 3,071,023 | 1/1963 | Herr et al. | 74/558.5 |
| 3,172,683 | 3/1965 | D'Antini | 74/558.5 |
| 3,823,618 | 7/1974 | Broyer | 74/558.5 |
| 3,851,542 | 12/1974 | Adams et al. | 188/376 |
| 3,911,759 | 10/1975 | Tanaka | 188/376 |
| 3,936,015 | 2/1976 | Dean | 74/493 |
| 3,960,031 | 6/1976 | Chometon | 188/376 |
| 4,655,416 | 4/1987 | Carnell et al. | 244/234 |

*Primary Examiner*—Galen Barefoot
*Assistant Examiner*—Rodney Corl
*Attorney, Agent, or Firm*—Cahill, Sutton & Thomas

[57] ABSTRACT

A cyclic control stick of the type used in helicopters for reducing the safety hazards associated with such a mechanism in the event of a crewman being thrown violently into contact with the cyclic control stick resulting from a crash or the like. The cyclic control stick is configured to break away upon the exertion of an impact force which exceeds a predetermined value and/or is exerted for more than a momentary time duration. The cyclic control stick is also configured to be adjustable so as to locate the grip thereof as far away from the crewman as possible for safety reasons without comprising the comfort of the crewman or the use of the control stick, and a crushable pad is provided on the top of the grip for impact energy absorbing purposes.

22 Claims, 2 Drawing Sheets

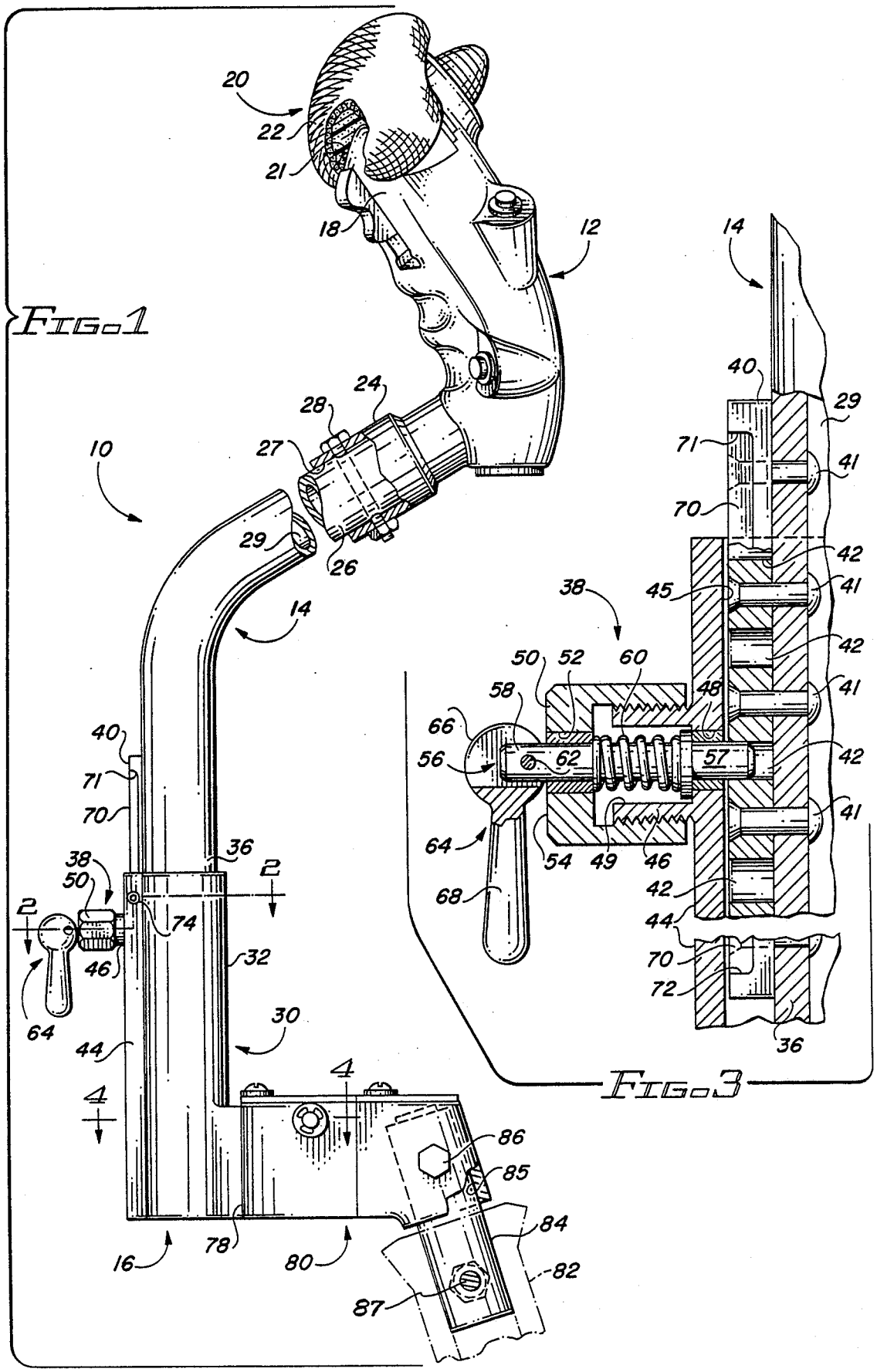

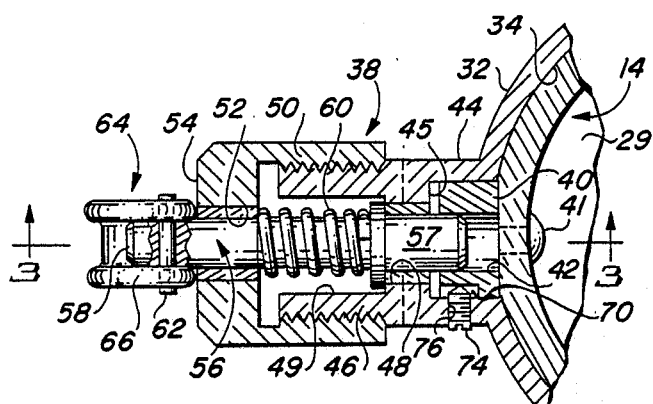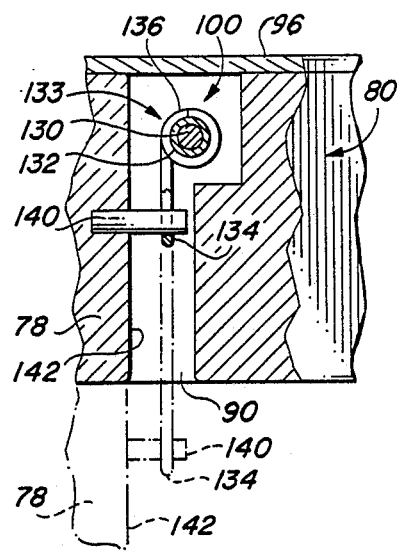

CYCLIC CONTROL STICK

This invention was made with Government support under contract DAAK51-84-C-0022 awarded by the Department of the Army. The Government has certain rights in this invention.

BACKGROUND OF THE INVENTION

1. Field of the Invention

This invention relates in general to cyclic control sticks of the type commonly used in helicopters, and more particularly to a cyclic control stick which is configured to reduce the safety hazards associated therewith by, among other things, breaking away upon exertion of an impact load thereon of a magnitude which could occur in crashes or abnormally sudden stops.

2. Description of the Prior Art

As in all vehicular crashes, serious and sometimes fatal injuries can result from the crewman of a helicopter being thrown into contact with various objects in his or her vicinity in an accident which could otherwise be considered as being survivable. Safety measures have been taken, such as the use of a five point restraint system, to hold the crewmen in place as much as possible and thereby reduce the size of the hazard area which is sometimes referred to as the "strike envelope".

Reduction in the size of the strike envelope has certainly resulted in improving the safety of the crewmen's environment in helicopters. However, some hazardous objects by necessity must remain within the strike envelope and the cyclic control stick is one such object due to its being conventionally located between the legs of the pilot. In the event of a crash or an abnormally sudden stop, the pilot's head or upper body can be thrown forward into contact with the cyclic control stick.

The safety problem associated with cyclic control sticks has worsened due to special energy-absorbing seats which are being used extensively in helicopters. Energy-absorbing seats, such as the one fully described in a commonly owned U. S. patent application, Ser. No. 943,169 filed on Dec. 18, 1986, entitled ADJUSTABLE SEAT CUSHION WITH TENSION LIMITING MEANS, are designed to reduce spinal injuries by moving downwardly at impact resulting from rapid vertical descent. Downward movement of the energy-absorbing seats at the time of impact moves the pilot's upper body and head closer to the cyclic control stick thus increasing the chances of serious injuries or fatalities resulting from the pilot being thrown into contact therewith.

Conventional cyclic control sticks are formed of rigid metal tubing and make no provisions for absorbing impact energy or otherwise improving the safety of a helicopter crewmen's environment. In addition to the lack of these safety considerations, prior art cyclic controls ticks also lack height adjustment capabilities and thus make no provisions for crewmen of different sizes.

Therefore, a need exists for a new and improved cyclic control stick which overcomes some of the problems and shortcomings of the prior art.

SUMMARY OF THE INVENTION

In accordance with the present invention, a new and improved cyclic control stick of the type used in helicopters is disclosed for reducing the safety hazards associated with such a device and for facilitating the use thereof.

In the event of a crash or other abnormally abrupt stop, the head or upper body of a helicopter pilot may be thrown violently into contact with the cyclic control stick causing a serious injury or fatality. To reduce this safety hazard, the cyclic control stick of the present invention includes an especially configured coupling assembly having an adapter housing for attachment of the cyclic control stick to the control input structure of the helicopter, and having a breakaway stalk in which the tubular standard and grip portions of the cyclic control stick are supported. The coupling assembly further includes an energy absorbing means and a slip joint means which interconnect the adapter housing and the breakaway stalk. The energy absorbing means maintains the interconnection of the adapter housing and the breakaway stalk when downwardly applied impact forces on the cyclic control stick are below a predetermined value and/or are applied for a momentary time duration. Maintaining of the interconnection under those conditions prevents unwanted separation of the breakaway stalk, tubular standard and grip from the adapter housing in non-emergency, or non-life threatening situations. In the event of the application of downwardly directed impact forces on the cyclic control stick of a magnitude greater than the predetermined value and for longer than the momentary time duration, the energy absorbing capabilities of the energy absorbing means will be exceeded. When exceeded in this manner, the interconnection of the breakaway stalk, the tubular standard, and grip will no long exist and the slip-joint means will cause the breakaway stalk, the tubular standard are the grip to fall freely away from the adapter housing.

In a first embodiment of the present invention, the energy absorbing means is of a configuration which may be referred to as a wire-bender energy absorber. A single length of wire is formed with a loop intermediate its opposite ends which is looped under a projecting stud provided on the breakaway stalk of the cyclic control stick. The opposite ends of the wire are wrapped around a bushing which is mounted for free rotation on a shaft that is carried in the adapter housing. When the downwardly directly impact forces are applied to the cyclic control stick, the stud provided in the breakaway stack will transmit the impact force to the wire by pulling downwardly on the loop thereof, When the impact forces are below the predetermined value and/or are of momentary duration, the wrapped around, or coiled, ends of the wire will not be pulled into a straight enough condition to allow them to become disengaged from the rotatable bushing of the adapter housing. When the impact forces are greater than the predetermined value and are applied for a time which is longer than the momentary duration, the coiled ends of the wire will be straightened and thus pulled out of engagement with the bushing of the adapter housing.

In a second embodiment of the present invention, the energy absorbing means is of a configuration which may be referred to as a tab-bender energy absorber. The tab-bender structure includes a load resistor which is attached to the adapter housing and has a plurality of tabs extending normally therefrom toward the breakaway stalk. The extending tabs are arranged in vertical alignment and are spaced apart with respect to each other. A bender plate is attached to the breakaway stalk so as to extend therefrom in overlaying relationship with respect to the uppermost one of the tabs of the load resistor. When downwardly directed impact forces are applied to the cyclic control stick, the breakaway stalk, tubular standard and grip will move downwardly and thereby move the bender plate downwardly into sequential bending engagement with the extending tabs of the load resistor. If the impact forces are below the predetermined value and/or are of a momentary time duration, less than all of the extending tabs of the load resistor will be bent out of the movement path of the bender plate. This will, of course, result in lowering of the breakaway stalk, tubular standard and the grip relative to the adapter housing but the interconnection of the breakaway stalk and the adapter housing will be maintained so that the cyclic control stick remains operable. When the impact forces are of sufficient magnitude and time duration to cause the bender plate to sequentially move all of the extending tabs of the load resistor out of its movement path, the interconnection between the breakaway stalk and the adapter housing will be broken and the slip joint means will cause the breakaway stalk, tubular standard and grip to fall freely away from the adapter housing.

A special bearing arrangement is preferably used to provide the slip joint means of the coupling assembly. In the absence of the interconnection provided by the above described energy absorbing means, the special bearing arrangement allows the free separation of the breakaway stalk from the adapter housing in a movement path which is parallel to the plane of the interconnection, i.e. in a shearing-like movement. The special bearing arrangement includes a wedge-shaped race structure with bearings loaded in opposing directions on that race to prevent separation of the breakaway stalk from the adapter housing in a movement path that is normal with respect to the shear-like movement path.

In addition to the above, the cyclic control stick is provided with a crushable pad means on the top of the grip which absorbs impact energy and enlarges the contact area of the grip to further reduce the safety hazards of the control stick. Still another safety consideration is the in-use location of the grip of the cyclic control stick. The grip should be as far away from the head and upper body of the helicopter pilot as possible without sacrificing pilot comfort and the ability to properly use the cyclic control stick. Since various factors such a pilot size, arm length and the like all enter into achieving optimum positioning, the cyclic control stick of the present invention includes a height adjustment means whereby the tubular standard, and thus the grip, may be adjusted relative to the breakaway stalk.

Accordingly, it is an object of the present invention to provide a new an improved cyclic control stick of the type used in helicopters which is configured for reducing the safety hazards associated with such devices.

Another object of the present invention is to provide a new and improved cyclic control stick wherein the upstanding portions of the control stick will breakaway in the event of the helicopter pilot being thrown into contact therewith as a result of a crash or other abnormally abrupt stop.

Another object of the present invention is to provide a new and improved cyclic control stick of the above described character wherein the breakaway feature is provided by an energy absorbing means and a slip joint means which interact to prevent breaking away upon the application of impact loads below a predetermined value and/or of a momentary time duration, and accomplishes the breaking away when the impact loading exceeds those factors.

Another object of the present invention is to provide a new and improved cyclic control stick of the above described type which further includes a crushable pad on the top of the grip of the cyclic control stick to absorb impact energy and enlarge the contact area of the grip.

Still another object of the present invention is to provide a new and improved cyclic control stick of the type used in helicopters wherein the cyclic control stick includes means for adjusting the height thereof to locate the grip as far away from the pilot as possible without sacrificing pilot comfort or the ability to properly use the control stick.

The foregoing and other objects of the present invention as well as the invention itself, may be more fully understood from the following description when read in conjunction with the accompanying drawings.

BRIEF DESCRIPTION OF THE DRAWINGS

FIG. 1 is a side view of the cyclic control stick of the present invention which is partially broken away to show some of the various features thereof.

FIG. 2 is an enlarged fragmentary sectional view taken along the line 2—2 of FIG. 1.

FIG. 3 is a fragmentary sectional view taken along the line 3—3 of FIG. 2.

FIG. 4 is an enlarged fragmentary sectional view taken along the line 4—4 of FIG. 1.

FIG. 5 is a fragmentary sectional view taken along the line 5—5 of FIG. 4.

FIG. 6 is a fragmentary sectional veiw similar to FIG. 4 and showing an alternate embodiment of the present invention.

FIG. 7 is a fragmentary sectional veiw taken along the line 7—7 of FIG. 6.

DESCRIPTION OF THE PREFERRED EMBODIMENTS

Referring more particularly to the drawings, FIG. 1 shows the cyclic control stick of the present invention which is indicated in its entirety by the reference numeral 10. A will hereinafter be described in detail, the cyclic control stick 10 includes the major components of a grip 12, a tubular standard 14 and a coupling assembly 16.

The grip 12 which is illustrated in FIG. 1 is intended to be representative of all such grips and the present invention is not intended to be limited to the particular configuration shown. However as is typical in all grips, the grip 12 has a top end 18 which forms what may be described as the contact area into which the helicopter pilot's head, neck or torso may be violently thrown in the event of a crash or other abnormally sudden and abrupt stop. To reduce the lethal nature of the top end 18 of the grip 12, a crushable pad means 20 is mounted on the contact area 18. The pad means 20 preferably includes a pad body 21 of crushable deformable material such as polyurethane foam having a density of about 5.0 pounds per cubic foot. The pad body 21 is encased within a protective cover 22, such as of nylon mesh, which protects the pad body 21 from wear and helps hold it in place in the event of impact. The crushable pad means 20 may be bonded to the top of the grip 12 by means of a suitable adhesive.

The grip 12 further includes a tubular boss 24 which extends from its lower end for mounting on the upper end 26 of the tubular standard 14. The upper end 26 of the standard 14 is disposed in the bore 27 of the boss 24, and a fastener means, such as the illustrated bolt-nut assembly 28, is located in suitably aligned holes to demountably hold the grip 12 on the standard 14.

The standard 14 is of tubular configuration to allow passage of electrical conductors (not shown), from the grip controls through the bore 29 of the standard to the helicopter equipment that is controllable from the grip. The actual length and curved shape of the standard 14 are optional.

A will hereinafter be described in detail, the coupling assembly 16 includes a breakaway stalk body 30 having an upstanding sleeve portion 32 which defines an upwardly opening axial bore 34. The lower end 36 of the tubular standard 14 is slideably mounted in the axial bore 34 of the sleeve 32, and a manually operably latching means 38 is provided to selectively and adjustably hold the standard 14 in desired telescopically extending positions. This provides the cyclic control stick 10 of the present invention with a heigh adjustment for locating the top of the grip 12 as far away from the helicopter pilot as possible without compromising pilot comfort and the ability for proper use of the cyclic control stick 10.

As shown in FIGS. 2 and 3, an elongated rack 40 is fixedly mounted on the lower end 36 of the tubular standard 14 such as by the rivets 41 so that the rack extends axially of the standard. A series of spaced apart holes 42 are formed in the rack 40 along the length thereof for selective engagement by the latching means 38. The upstanding sleeve portion 32 of the breakaway stalk body 30 has an extending protrusion 44 which defines an elongated groove 45 that opens inwardly into the bore 34 of the sleeve 32. The elongated rack 40 of the tubular standard 14 is disposed so as to be slideably moveable in the groove 45. An externally threaded boss 46 extends normally from the protrusion 44 of the sleeve and defines a bore 48 which opens into the groove 45 and has a suitable bushing mounted therein. The boss 46 further defines a counterbore 49 which opens onto the extending end of the boss 46. An internally threaded nut 50 is mounted on the boss 46 and has a suitable bushing mounted in an opening 52 formed axially through its otherwise closed end 54. A slide pin 56 having a front end 57 and a back end 58, is mounted for movement in the bushing of the bore 48 of the boss 46 and the bushing of the opening formed in the nut 50. A compression spring 60 is disposed in the counterbore 49 of the boss 46 for biasing the slide pin 56 to an extending position wherein its front end 57 extends into a selected one of the holes 42 of the rack 40. The back end 58 of the slide pin 56 extends axially from the closed end 54 of the nut 50 and is eccentrically connected by means of a suitable pin 62 to a manually operable cam lever 64. The cam lever 64 includes a bifurcated cam 66 of circular configuration which is held in bearing engagement with the closed end 54 of the nut 50 by action of the compression spring 60. Due to the eccentric connection of the slide pin 56 to the cam 66 of the cam lever 64, manual lifting of a handle 68 of the lever will move the slide pin 56 to a retracted position wherein its front end 57 is pulled out of engagement with the rack 40 of the tubular standard 14.

Therefore, the tubular standard 14 is telescopically adjustable in the upstanding sleeve 32 of the breakaway stalk body 30. To prevent the tubular standard 14 from being moved beyond its intended adjustment range, either upwardly or downwardly, an elongated groove 70 is formed in one side of the rack 40 that is mounted on the tubular standard 14. The groove 70 is closed at its top and bottom ends as indicated at 71 and 72, respectively, to serve as stops. A set screw 74 is threadingly carried in a bore 76 formed in the side of the protrusion 44 of the sleeve 32 of the breakaway stalk body 30. As shown in FIG. 2, the set screw 74 protrudes into the groove 70 of the rack 40 and will therefore limit both the up and down movements of the standard 14 in the sleeve 32.

As seen best in FIG. 4, the breakaway stalk body 30 includes a tongue 78, in addition to the upstanding sleeve 32 The tongue 78 extends normally from the lower end of the sleeve 32 in a direction which is diametrically opposed to the protrusion 44 of the sleeve.

In addition to the breakaway stalk body 30, the coupling assembly 16 further includes an adapter housing 80. As will hereinafter be described, the stalk body 30 is connected to the adapter housing for separation upon the exertion of an impact force on the top end of the grip 12 of the cyclic control stick 10. The adapter housing also provides means for connection of the cyclic control stick 10 to the control input mechanism of the helicopter, with the input mechanism being indicated by the reference numeral 82 in FIG. 1. For this reason, the adapter housing 80 is provided with a mounting means 84 which is shown in the form of a shaft which is carried in a bore 85 provided in one end of the adapter housing. The shaft 84 is mounted in the bore 85 by means of a suitable bolt 86 and depends angularly from the adapter housing 80 for connection to the helicopter input mechanism 82 such as by means of the illustrated bolt 87.

The opposite end of the adapter housing 80 is bifurcated to define an open cavity 90 between a pair of arms 92 and 94. The housing 80 is a cover 96 mounted thereon which closes the top of the cavity 90 with the cavity being otherwise open, i.e. both laterally and downwardly.

The tongue 78 of the breakaway stalk body 30 is normally disposed so as to extend into the cavity 90 through the lateral opening thereof, and a slip joint means 98 and an energy absorbing means 100 combine to interconnect the stalk body 30 and the adapter housing 80 and to allow separation in response to the aforementioned impact forces.

The tongue 78 is formed with one side surface 102 which is planar and an opposed side surface which has a transversely extending substantially V-shaped groove 104 formed therein. A first bearing race 106 is affixed, such as by means of a suitable adhesive, to the planar surface 102 of the tongue 78, and a pair of bearing races 107 and 108 are each similarly affixed to different ones of the diverging surfaces of the V-shaped groove 104. A wedge shaped bearing race 110 is interposed between the inwardly facing surface of the arm 94 and the V-shaped groove 104 of the tongue 78. A dowel 111 extends from the wedge-shaped race 110 into a channel 112 that is transversely formed in the inwardly facing surface of the arm 94. The dowel-channel arrangement prevents lateral movements of the wedge-shaped race 110 and allows it to move along the length of the channel 112 for reasons which will be hereinafter described. A pair of caged roller bearings 114 and 116 are each interposed between a different one of the converging bearing race surfaces of the wedge-shaped race 110 and the races 107 and 108 that are mounted in the V-shaped groove 104 of the tongue 78. An adjustable planar plate defining a bearing race 118 is interposed between the arm 92 and the race 106 that is mounted on the planar surface 102 of the tongue 78. The adjustable race 118 has a projecting dowel 120 which extends normally therefrom into a channel 122 that is formed transversely in the inwardly facing surface of the arm 92. A is the case with the wedge-shaped bearing race 110, the dowel-channel arrangement of the adjustable bearing race 118 prevents lateral movements of the race but allows it to move along the length of the channel 122. A caged roller bearing 124 is interposed between the adjustable bearing race 118 and the race 106 that is fixed on the planar surface 102 of the tongue 78.

In addition to the free movement of the adjustable bearing race 118 in a direction transverse with respect to the extending length of the arm 92, the adjustable bearing race 118 is movable toward and away from the planar surface 102 of the tongue 78. Such movement of the adjustable bearing race 118 is controlled by a plurality of adjustment screws 126 which are threadingly carried in suitable bores formed in the arm 92 of the adapter housing 80. The adjustment screws 126 extend into bearing engagement with the adjustable bearing race 118 for adjustable positioning thereof so that the race 118 will exert a desired load on the bearings 114, 116 and 124.

From the above, it will be seen that because of the dowel-channel mounting arrangements of the adjustable and wedge-shaped races 118 and 110, those races are prevented from moving laterally with respect to the extending length of the arms 92 and 94 of the adapter housing 80. Due to the angular and opposed orientation of the surfaces of the wedge-shaped race which holds the bearings 114 and 116 in engagement with the diverging surfaces of the V-shaped groove 104, the tongue 78 and thus the breakaway stalk body 30, are also prevented from moving laterally with respect to the extending length of the arms 92 and 94 of the adapter housing 80. However, the tongue 78 is journaled for free movement in a direction which is transverse with respect to the extending length of the arms 92 and 94. The hereinbefore mentioned cover 96 which closes the upper end of the cavity 90 defined between the arms 92 and 94, prevents the breakaway stalk body 30 from being pulled upwardly from between the arms 92 and 94. But, the bottom end of the cavity 90 is open as indicated in FIG. 5, and the breakaway body 30 is free to fall out of the bottom of that cavity 90 by virtue of the hereinbefore described bearing arrangement of the slip-joint means 98.

The above mentioned energy absorbing means 100 is used to keep the breakaway stalk body 30 from falling out of the open bottom of the cavity 90 of the adapter housing in the absence of impact forces of predetermined magnitude and time duration.

In a first embodiment, the energy absorbing means 100 which may be referred to as a wire-bender energy absorbing device, is shown in FIGS. 4 and 5. The wire-bender device 100 includes a shaft 130 which has its opposite ends disposed in suitably aligned openings formed in the arms 92 and 94 so that the shaft 130 extends transversely across the cavity 90 proximate the inwardly disposed closed end thereof. A suitable roller bushing 132 is mounted on the shaft 130 for rotation about the longitudinal axis thereof. A load resistor in the preferred form of a single length of wire 133 such as music wire, is formed with a loop 134 intermediate its opposite ends, and its opposite ends 136 and 138 are wrapped around the roller bushing 132 to form coils. A stud 140 extends normally from the distal end 142 of the tongue 78 of the breakaway stalk body 30 into the loop 134 of the wire. Thus, the stalk body 30 is supported and connected to the adapter housing 80 by virtue of the stud 140 and the loop 134 of the wire 133.

When an impact force is applied downwardly on the cyclic control stick 10, that force will be transmitted by the stud 140 to the bender wire 133 which will tend to straighten the coiled ends 136 and 138 by unwinding them from their wrapped around placement on the roller bushing 132. When the applied impact force is below a predetermined value, or is applied for only a momentary time duration, the full unwinding of the coiled end 136 and 138 will not occur. This prevents unwanted separation of the breakaway stalk body 30, and the tubular standard 14 and grip 12 carried thereby, from the adapter body 80 as a result of short duration and/or impact forces which are less than life threatening, i.e. less than that can be reasonably expected in the event of a crash or other abnormally abrupt stop. However, upon the occurrence of such an event and the helicopter pilot is thrown violently into contact with the cyclic control stick 10, the bender wire 133 will be pulled off the roller bushing 132, and the breakaway stalk body 30, the tubular standard 14 and the grip 12 will separate from the adapter housing 80, as a result of the above described slip-joint means 98, by falling onto the floor of the helicopter, as indicated in dashed lines in FIG. 5.

Reference is now made to FIGS. 6 and 7 wherein a modification of the cyclic controls tick of the present invention is shown as including a second embodiment of the energy absorbing means in the form of a tab-bender structure which is indicated generally by the reference numeral 144. The above described slip-joint means 98 is used in this embodiment for interconnecting a modified breakaway stalk body 30A to a modified adapter housing 80A. The stalk body 30A is provided with a bender plate 146 that is mounted, such as by means of the illustrated screw 147, in a notch 148 which is formed for that purpose in the top surface of the tongue 78A. Also, the tongue 78A has a cover 149 mounted thereon for closing the bottom end of the cavity 90 without interfering with the desired separation of the stalk body 30A from the adapter housing 80A. The bender plate 146 extends normally from the distal end 142A of the tongue 78A into the open space provided at the innermost end of the cavity 90 defined by the adapter housing 80A. A load resistor means 150 is attached, such as by the illustrated screws 151, and 157 the surface 152 of the adapter housing 80A which defines the inner closed end of the cavity 90. The load resistor means 150 includes a flat plate 154 from which a plurality (three shown) of tabs 156 extend normally toward the distal end 142A of the tongue 78A of the stalk body 30A. As shown, the extending tabs 156 are arranged in vertically spaced alignment with each other so that impact forces will result in downward movement of the bender plate 146 into sequentially deflecting engagement with the tabs 156.

Therefore, the tab-bender energy absorber means 144 will react to impact forces much in the same manner as the hereinbefore described wire-bender energy absorber 100. In other words, impact forces below a predetermined value and/or of a momentary duration will not result in full separation, but forces which meet or exceed those built-in safety factors will result in separation.

Dynamic testing of the cyclic control stick 10 of the present invention has indicated that a substantial reduction in the severity of serious injuries an d fatalities can be expected in comparison to the cyclic control sticks currently being used in, for example, the UH-60A Black Hawk helicopter. Head injury severity which is measured by a "HIC" value (head injury criterion) showed a reduction to 568 of the cyclic control stick 10 in comparison to a HIC value of 1026 for the control stick currently being used in the UH-60A Black Hawk helicopter.

Although the predetermined impact force value at which separation of the cyclic control stick 10 will occur may be altered, a force of approximately 125 pounds exerted on the energy absorber means appears to be a satisfactory comprise between maintaining the operability of the cyclic control stick in non-like threatening situations and reducing the seriousness of injuries or fatalities in life-threatening situations.

While the principles of the invention have now been made clear in the illustrated embodiments, there will be immediately obvious to those skilled in the art, many modifications of structure, arrangements, proportions, the elements, materials and components used in the practice of the invention and otherwise, which are particularly adapted for specific environments and operation requirements without departing from those principles. The appended claims are therefore intended to cover and embrace any such modifications within the limits only of the true spirit and scope of the invention.

What we claim is:

1. A cyclic control stick, being capable of operating the control input mechanism of a helicopter, for reducing injuries and fatalities resulting from the pilot of the helicopter being thrown into contact with said cyclic control stick as a result of a crash or an abnormally abrupt stop, said cyclic control stick comprising:
   (a) a tubular standard having upper and lower ends;
   (b) a grip on the upper end of said tubular standard;
   (c) a stalk body means mounted on the lower end of said tubular standard;
   (d) an adapter housing means connected to the control input mechanism of the helicopter; and
   (e) separating means for interconnecting said stalk body means and said adapter housing means and for breaking the interconnection therebetween in response to a downwardly directed impact force being exerted on said grip when the impact force exceeds a predetermined value and is exerted for more than a momentary time duration so that said stalk body means, said tubular standard and said grip will separate from said adapter housing means upon the occurrence of such a force.

2. A cyclic control stick as claimed in claim 1 wherein said separating means comprises:
   (a) slip-joint means on said stalk body means and said adapter housing means for free movement of said stalk body means, said tubular standard and said grip in a generally downward direction relative to said adapter housing means; and
   (b) energy absorbing means on said stalk body means and on said adapter housing means for maintaining the interconnection of said stalk body means and said adapter housing means in the absence of impact forces which exceed the predetermined value and are exerted for longer than the momentary time duration.

3. A cyclic control stick as claimed in claim 1 and further comprising a crushable pad means mounted on the top of said grip for absorbing impact forces.

4. A cyclic control stick, being capable of operating the control input mechanism of a helicopter, for reducing injuries and fatalities resulting from the pilot of the helicopter being thrown into contact with said cyclic control stick as a result of a crash or an abnormally abrupt stop, said cyclic control stick comprising:
   (a) a tubular standard having upper and lower ends;
   (b) a grip on the upper end of said tubular standard;
   (c) a stalk body means mounted on the lower end of said tubular standard, said stalk body means having an upstanding sleeve defining an axial bore in which the lower end of said tubular standard is mounted and having a tongue which extends laterally from said sleeve and has an opposed pair of said surfaces and a distal end surface;
   (d) an adapter housing means connected to the control input mechanism of the helicopter, said adapter housing means having a pair of arms extending in spaced apart relationship from a surface of said adapter housing means and defining a cavity therebetween which opens in the extending direction of said pair of arms and in the downward direction transverse to the extending direction of said pair of arms, said tongue of said stalk body means being disposed in the cavity of said adapter housing means so that each of the side surfaces of said tongue is adjacent a different one of said pair of arms and a space is provided between the distal end of said tongue and the surface of said adapter housing means; and
   (e) separating means for interconnecting said stalk body means and said adapter housing means for breaking the interconnection therebetween in response to a downwardly directed impact force being exerted on said grip when the impact force exceeds a predetermined value and is exerted for more than a momentary time duration so that said stalk body means, said tubular standard and said grip will separate from said adapter housing means upon the occurrence of such a force, said separating means comprising:
      (i) slip-joint means on said stalk body means and said adapter housing means for accommodating free movement of said stalk body means, said tubular standard and said grip being in a generally downward direction relative to said adapter housing means, said slip-joint means being in the form of bearing means interposed between the opposed pair of side surfaces of said tongue of said stalk body means and the arms of said adapter housing means; and
      (ii) energy absorbing means on said stalk body means and on said adapter housing means for maintaining the interconnection of said stalk body means and said adapter housing means in the absence of impact forces which exceed the predetermined value and are exerted for longer than the momentary time duration, said energy absorbing means being disposed in the space provided between the distal end of said tongue of said stalk body means and the surface of said adapter housing means.

5. A cyclic control stick as claimed in claim 4 wherein said bearing means of said slip-joint means comprises:
   (a) first bearing assembly interposed between one of the side surfaces of said tongue of said stalk-body means and the adjacent one of said pair of arms of said adapter housing means; and
   (b) second bearing assembly interposed between the other one of the side surfaces of said tongue of said stalk-body means and the other one of said pair of arms of said adapter housing means.

6. A cyclic control stick as claimed in claim 5 and further comprising:
   (a) said one of the side surface of said tongue of said stalk-body means having a substantially V-shaped groove formed transversely therein to provide a pair of diverging surfaces;
   (b) said adjacent one of said pair of arms of said adapter housing means having a channel formed in the inwardly facing surface thereof so as to extend transversely of the extending direction of said adjacent one of said pair of arms; and
   (c) said first bearing assembly including,
      i. a pair of bearing races each on a different one of the diverging surfaces of the substantially V-shaped groove formed in said one of the side surfaces of said tongue of said stalk-body means,
      ii. a wedge-shaped bearing race defining a pair of converging bearing race surfaces each of which is proximate a different one of said pair of bearing races,
      iii. dowel means extending from said wedge-shaped bearing race into the channel formed in said adjacent one of said pair of arms of said adapter housing means,
      iv. a pair of roller bearing means each interposed between a different one of the bearing race urfaces of said wedge-shaped bearing race and the one of said pair of bearing races which is proximate thereto.

7. A cyclic control stick as claimed in claim 5 and further comprising:
   (a) said other one of the side surfaces of said tongue of said stalk-body means being of planar configuration;
   (b) said other one of said pair of arms of said adapter housing means having a channel formed in the inwardly facing surface thereof so as to extend transversely of the extending direction of said other one of said pair of arms; and
   (c) said second bearing assembly including,
      i. a bearing race on the other one of the side surfaces of said tongue of said stalk-body means,
      ii. a planar plate defining a bearing race surface, said planar plate being disposed proximate said bearing race,
      iii. dowel means extending from said planar plate into the channel formed in said other one of said pair of arms of said adapter housing means,
      iv. roller bearing means interposed between said bearing race and the bearing race surface of said planar plate.

8. A cyclic control stick as claimed in claim 7 and further comprising adjustment means for moving said planar plate toward and away from said tongue of said stalk-body means for adjusting the pre-load on said first and said second bearing assemblies.

9. A cyclic control stick as claimed in claim 4 wherein said energy absorbing means comprises:
   (a) shaft means mounted in said adapter housing means so as to extend across the cavity defined thereby;
   (b) a bender wire having its opposite ends wrapped around said shaft means and having an upwardly opening loop depending therefrom; and
   (c) a stud extending from the distal end of said tongue of said stalk-body means into engagement with the loop of said bender wire so that impact forces exerted in a generally downward direction on said grip will be transmitted by said stud to the loop of said bender wire for pulling the opposite ends of said bender wire out of wrapped around engagement with said shaft means when the impact forces exceed the predetermined value and are exerted for more than the momentary time duration.

10. A cyclic control stick as claimed in claim 9 wherein said shaft means comprises:
    (a) a shaft;
    (b) a roller bushing mounted for rotation about the longitudinal axis of said shaft; and
    (c) said opposite ends of said bender wire being wrapped around said roller bushing.

11. A cyclic control stick as claimed in claim 4 wherein said energy absorbing means comprises:
    (a) a bender plate means extending from said tongue of said stalk body means toward said adapter housing means;
    (b) a load resistor means mounted on said adapter housing means and having at least one deflectable tab extending therefrom in underlaying supportive engagement with said bender plate means so that impact forces exerted in a generally downward direction on said grip will move said bender plate means downwardly to bend said deflectable tab out of supportive engagement therewith when the impact forces exceed the predetermined value and are exerted for more than the momentary time duration.

12. A cyclic control stick as claimed in claim 11 wherein said load resistor means includes a plurality of said deflectable tabs arranged in vertically spaced relationship with each other below said bender plate so that said bender plate will move downwardly into sequential bending engagement therewith when the impact forces exceed the predetermined value and are exerted for more than the momentary time duration.

13. A cyclic control stick as claimed in claim 4 and further comprising means for axially relocating the mounted position of the lower end of said tubular standard in the axial bore of said sleeve of said stalk body means for adjusting the height of said tubular standard and said grip relative to said stalk body means.

14. A cyclic control stick as claimed in claim 13 wherein said means for axially relocating the mounted position of the lower end of said tubular standard comprises:
    (a) an elongated rack mounted on the lower end of said tubular standard and having a plurality of holes formed in spaced apart relationship along the length thereof so that the holes extend laterally of the axis of said tubular standard; and
    (b) latching means mounted on said sleeve of said stalk body means for selective engagement with a desired one of the holes of said rack.

15. A cyclic control stick as claimed in claim 14 wherein said latching means is manually operable.

16. A cyclic control stick as claimed in claim 14 wherein said latching means comprises:
(a) a boss extending laterally from said sleeve of said stalk body means and defining an axial bore which opens into said sleeve of said stalk body means;
(b) nut means on said boss and having an opening formed axially through an otherwise closed end thereof;
(c) a pin having a front end and being mounted for axial movement in the bore of said boss between an extended position wherein the front end of said pin is in engagement with a desired one of the holes of said rack and a retracted position wherein the front end of said pin is out of engagement with the holes of said rack, said pin having a back end which extends through the opening of said nut means;
(d) biasing means in the bore of said boss for yieldably urging said pin to its extended position; and
(e) manually operable lever means connected to the back end of said pin for movement thereof between its extended and retracted positions.

17. A cyclic control stick as claimed in claim 4 wherein said energy absorbing means comprises a load resistor means in engagement with said tongue of said stalk-body means and demountably attached to said adapter housing means so that impact forces exerted in a generally downward direction on said grip will break the demountable attachment of said load resistor means to said adapter housing means when the impact forces exceed the predetermined value and are exerted for more that the momentary time duration.

18. A detachably attachable cyclic control stick for use with the control input mechanism of a helicopter, said cyclic control stick comprising:
(a) housing means for connecting said cyclic control stick to the control input mechanism of the helicopter, said housing means including a sleeve defining an axial bore;
(b) a tubular standard having upper and lower ends, said tubular standard being mounted for telescopically adjustable movement in the axial bore of the sleeve of said housing means;
(c) means for releasably holding said tubular standard in desired telescopically adjusted positions in the axial bore of the sleeve of said housing means;
(d) a grip mounted on said upper end of said tubular standard; and
(e) said housing means including;
(i) a stalk body having the sleeve of said housing means formed thereon;
(ii) an adapter housing for connecting said cyclic control stick to the control input mechanism of the helicopter; and
(iii) separating means interconnecting said stalk body and said adapter housing for breaking the interconnection therebetween in response to a downwardly directed impact force being exerted on said grip when the impact force exceeds a predetermined value and is exerted for longer than a momentary time duration so that said stalk body, said tubular standard and said grip will separate away from said adapter housing upon application of such an impact force.

19. A cyclic control stick as claimed in claim 18 wherein said means for releasably holding said tubular standard is manually operable.

20. A cyclic control stick as claimed in claim 18 wherein said means for releasably holding said tubular standard comprises:
(a) an elongated rack mounted on the lower end of said tubular standard so as to extend in parallel relationship with the longitudinal axis of said tubular standard, said rack having a plurality of holes formed in spaced apart relationship along the length thereof with said holes being normal with respect to the longitudinal axis of said tubular standard; and
(b) latching means mounted on the sleeve of said housing means for selective engagement with a desired one of the holes of said rack.

21. A cyclic control stick as claimed in claim 20 wherein said latching means comprises:
(a) a boss extending laterally from the sleeve of said housing means and defining an axial bore which opens into the sleeve of said housing means;
(b) nut means on said boss and having an opening formed axially through an otherwise closed end thereof;
(c) a pin having a front end and being mounted for axial movement in the bore of said boss between an extended position wherein the front ene of said pin is in engagement with the desired one of the holes of said rack and a retracted position wherein the front end of said pin is out of engagement with the holes of said rack, said pin having a back end which extends through the opening of said nut means;
(d) biasing means in the bore of said boss for yieldably urging said pin to its extended position; and
(e) a manually operably lever means connected to the back end of said pin for movement thereof between its extended and retracted positions.

22. a cyclic control stick as claimed in claim 18 and further comprising a crushable pad means on the top end of said grip.

* * * * *